Aug. 18, 1959  A. I. APPLETON  2,900,436
ELECTRICAL CONDUIT UNION AND EXPANSION COUPLING
Original Filed May 17, 1954  2 Sheets-Sheet 1
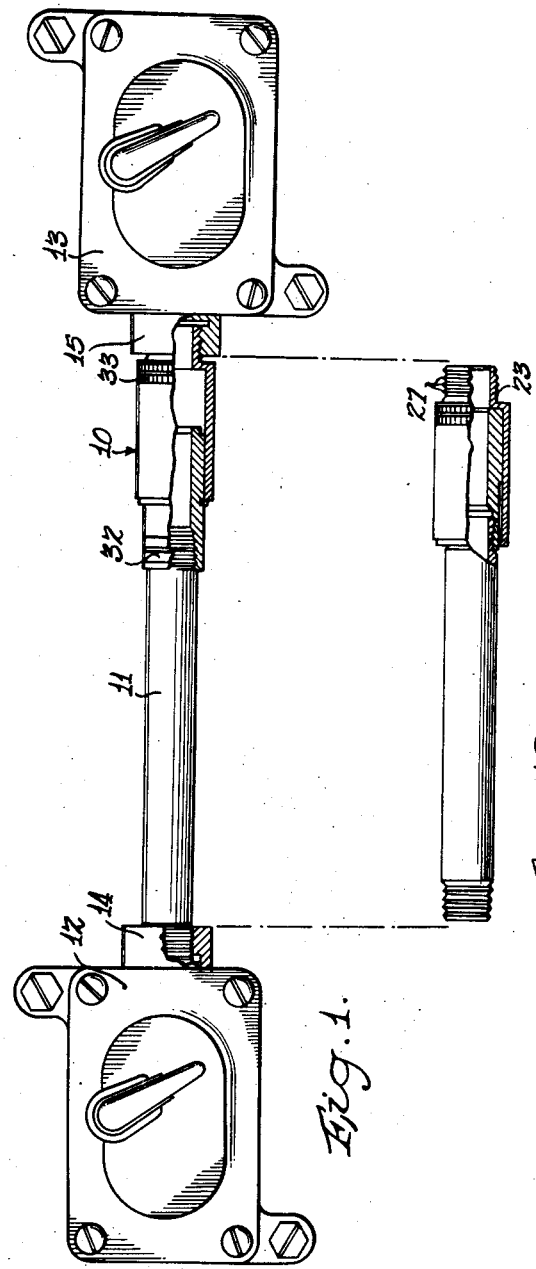
Inventor
Arthur I. Appleton
by Carlson, Pitzner, Hubbard & Wolfe
Atty's

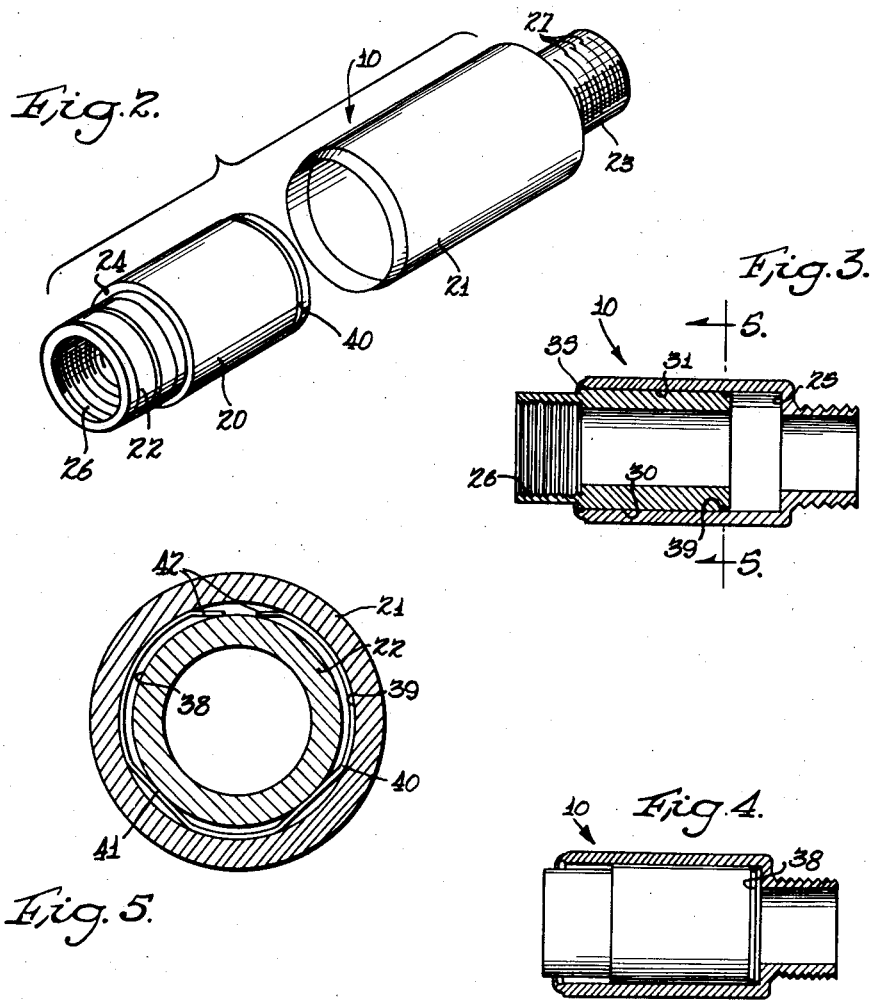

United States Patent Office 2,900,436
Patented Aug. 18, 1959

2,900,436

ELECTRICAL CONDUIT UNION AND EXPANSION COUPLING

Arthur I. Appleton, Northbrook, Ill.

Continuation of application Serial No. 430,152, May 17, 1954. This application March 6, 1958, Serial No. 719,539

1 Claim. (Cl. 174—86)

The present invention relates in general to explosionproof conduit systems for protectively housing electrical wiring and equipment in hazardous areas where an electrical spark or arc might trigger a violent explosion unless special provisions are made to prevent that. The invention relates more particularly to fittings or unions of the general type shown in Tornblom United States Patent No. 2,106,444, for use in connecting the components of such explosionproof conduit systems.

It is the general aim of the invention to provide a new and improved expansible conduit union which requires only two parts and yet which is completely safe and reliable as an explosionproof component.

A related object is to provide such an explosionproof conduit union in which two members are both relatively rotatable and axially movable, affording ease of connection and disconnection to matingly threaded conduit system components.

Coordinate with that aim, other objects of the invention are the provision of such an explosionproof union which always retains its explosionproof integrity regardless of the relative positions of the adjustable parts; in which the mating surfaces which coact to form a flame-arresting tortuous path are always protected against marring or other damage; and which assures that relatively telescoping and rotatable parts are always electrically connected so that the conduit system is grounded without the necessity of employing separate grounding connections on opposite sides of the union, or a separate jumper.

It is a further object to bring forth an expansible explosionproof conduit union which in itself enables the insertion of a single piece of conduit between two fixed components, in contrast to prior explosionproof unions which necessitated that two unions be employed for that purpose. An additional object is to provide such an explosionproof union which is smaller in diameter than prior explosionproof couplings, affording convenient installation in close quarters.

Still another object is to provide such an explosionproof union which is simple and economical in construction and installation, and when once installed serves as an expansion joint to prevent thermally induced stresses in conduits or the like.

Additional objects and advantages will become apparent as the following description proceeds, taken in conjunction with the accompanying drawings, in which:

Figure 1 is an elevational view, partially in section, of a part of an electrical conduit system employing an explosionproof union embodying the features of the invention;

Fig. 1a is a fragmentary elevation, partially in section, of the explosionproof union and a length of conduit just prior to installation in the conduit system of Fig. 1;

Fig. 2 is an exploded perspective illustration of the explosionproof union employed in Figs. 1 and 1a, the two principal elements of the union being shown prior to assembly at the factory;

Figs. 3 and 4 are longitudinal cross sections of the explosionproof union, illustrating the same in totally extended and collapsed conditions, respectively; and Fig. 5 is a detail view in section taken substantially along the line 4—4 in Fig. 3.

While the invention has been shown and is described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Referring now to the drawings, there is illustrated in Figs. 1–4 an explosionproof electrical conduit union 10 which is constructed in accordance with the present invention. As shown by way of example in Figure 1, the single union 10 is employed in coupling a length of rigid, heavy wall conduit 11 between two enclosures for electrical apparatus, here illustrated as explosionproof switch boxes 11 and 12, which are rigidly fixed in place with predetermined spacing. For receiving the connecting components, the switch boxes 12 and 13 are provided with conventional internally threaded bosses or hubs 14 and 15, respectively.

It has been found that it is practically impossible to prevent explosive fumes in the atmosphere from entering the interior of a closed conduit system. While there may always be the possibility of an internal explosion resulting from arcing due to defective insulation or switches, the system may be constructed to tolerate such internal explosion and at the same time prevent the occurrence of an external explosion. In rendering a closed conduit system explosionproof, i.e., completely safe from the possibility of igniting a surrounding explosive atmosphere as a result of an electric spark occurring at switch contacts or in other equipment housed within the system, it is necessary either (1) to completely seal the system and render it sufficiently strong to withstand and contain the very high pressures of an internal explosion; or (2) to provide tortuous paths which vent hot gases generated by an internal explosion, the tortuous paths being of such a nature as to cool the escaping hot gases well below the ignition point of any surrounding explosive atmosphere. The latter provision is made in the explosionproof conduit system illustrated in Fig. 1.

Referring for the moment more particularly to Figs. 2–4, the explosionproof union 10 will be seen to comprise inner and outer hollow cylindrical metallic members 20 and 21 which are adapted to interfit with freedom for relative axial and rotational movement. The members may be conveniently manufactured, for example, by automatic screw machines, each being formed with a necked-down end portion 22, 23, respectively, defining an external radial shoulder 24 on the inner member and an internal radial shoulder 25 within the outer member. The end portions 22 and 23 are adapted by means, such as respective internal and external threads 26, 27 for threaded engagement with other components of an explosionproof conduit system.

In accordance with an important feature of the invention, the union 10 is rendered explosionproof by means of a surprisingly simple construction which permits axial telescoping of the members 20, 21 through a relatively great range, and yet always provides a long, tortuous path for safely venting and cooling hot gases resulting from an internal explosion, the effectiveness of such path being independent of the axial telescoping movement of the members 20, 21. In accomplishing these dual results, the two conduit members 20, 21 are provided with respective outer and inner surfaces 30, 31 which extend axially of the union 10 and are adapted to interfit with extremely close tolerance (on the order of .003", for example) while permitting the relative movement described.

The surfaces 30, 31 may even be provided with a satin finish, rather than being highly polished, so as to enhance the explosionproof effectiveness of the tortuous path therebetween. The axial length of the outer surface 30 is made equal in length to at least twice the minimum length of the threaded connections in the conduit system. By this provision, a very long, narrow path is always present between the closely fitting surfaces 30 and 31, regardless of their relative axial or rotational positions. That path will also be tortuous, due to the inevitable, extremely minute irregularities in the surfaces 30 and 31. If hot gases and flames from an internal explosion attempt to pass through such long, tortuous path, they will be so cooled by the time delay and the absorption of heat by the metal surfaces that, upon escape into the outer atmosphere, they will have been cooled below the ignition point of explosive mixtures that may be present. Thus, an explosion outside of the conduit system will not be set off.

In connecting the single length of conduit 11, which is externally threaded on its opposite ends, between the two fixed bosses or hubs 14 and 15 (Fig. 1), it is necessary that the union and the conduit when initially connected be capable of collapsing so that they may be interposed between the two bosses (Fig. 1a). Subsequently, it is necessary that the union enable expansion sufficient to permit full engagement of the threads on the left end of the conduit 11 with those in the boss 14, and likewise for full engagement of the threads 27 on the end portion 23 with the threads in the boss 15. As is known to those skilled in this art, such threaded joints must be a minimum length for explosionproof security, i.e., so that hot gases and flames cannot pass therethrough to ignite an explosive external atmosphere, if an explosion should occur in the interior of the conduit system. Most usually, such threaded joints must have a minimum length equal to the span of five full threads.

In making it possible for the single union 10 to afford connection of the conduit 11 between the fixed bosses 14 and 15, the member 21 is so dimensioned that the outer surface 30 of the inner member 20 is axially shorter than the surface 31 by an amount equal substantially to twice the minimum length of the thread connections to be established within the bosses. That is, the surface 31 is axially longer than the surface 30, so that the inner and outer members can have "lost motion" equal to the length of at least two threaded connections.

To install the conduit in place, therefore, the union 10 may be collapsed (Figs. 1a and 4) through the length of two threaded connections (until the inner end of the member 20 abuts the shoulder 25) so that with the right end of the conduit 11 threaded into the end portion 22, the sub-assembly may be inserted between the bosses 14 and 15. The inner and outer members 20, 21 may then be rotated relative to one another in order to effect threaded connection of the conduit 11 with the boss 14 and a corresponding threaded connection of the end portion 23 in the boss 15, there being tool engaging elements 32, 33 knurled or otherwise formed on the respective members to permit firm gripping by a pipe wrench or other appropriate tool.

With the union 10 thus expanded as a result of such installation (Figs. 1 and 3), the outer and inner surfaces 30, 31 remain in close interfitting engagement through an axial length equal approximately to that of two threaded connections. Accordingly, there remains a long tortuous path between the surfaces which permits the escape of gases in the event of an internal explosion within the conduit system, but which causes cooling of any escaping gases to such an extent that they cannot ignite a surrounding explosive atmosphere. It will also be apparent that as the conduit 11 expands and contracts with temperature variations, the inner and outer members 20, 21 may shift relative to one another, thus serving as a completely explosionproof expansion joint and preventing rupture or buckling of the conduit components or undue stress upon the several threaded connections.

The foregoing arrangement contrasts sharply with that employed in conventional explosionproof unions where the mating surfaces are transverse to the axis of the union. With such conventional unions installed between fixed hubs or bosses, it is quite possible that the mating surfaces of the fitting might fail to abut fully and squarely when initially installed, or that the threaded conduit connections will have excessive residual stresses as a result of bringing the mating union surfaces into abutment. The diameter of such conventional explosionproof unions must also be much greater in order to provide a tortuous path of sufficient length between the abutting radial surfaces. Because of such great diameters, the use of the prior explosionproof unions often required that conduits be spaced considerably from walls or other structural surfaces. The union 10, being of small diameter because a long tortuous path is established in a direction lengthwise of the parts, substantially eliminates the difficulty.

Smooth mating fit of the surfaces 30 and 31 is essential to the explosionproof safety of the union 10. If those surfaces are nicked, dented, or otherwise marred, the clearance between them may be opened sufficiently to permit the escape of hot gases without the cooling action necessary to preclude external explosions. In keeping with another feature of the invention, the possibility of such damage to the surfaces 30 and 31 is precluded by means which lock the members 20 and 21 against separation after they have been assembled at the factory. Since the outer member 21 always surrounds and protects the surface 30 of the inner member, the surfaces 30 and 31 cannot be damaged as a result of dropping or other rough handling of the union 10 by workmen in the field.

To prevent the complete separation of the inner and outer members 20, 21, of the union 10 and the consequent possibility of the loss of one, the outer member 21 is formed to include at one end a deformable skirt 35 which is turned radially inward after the parts are assembled. The skirt 35 thus abuts the external shoulder 24 on the inner member when the parts are totally extended and limits further axial expansion. By this provision the accurately machined interfitting surfaces 30, 31 are maintained totally enclosed and protected throughout the life of the union so that they cannot be marred or have their closely fitting relation impaired.

In nearly all electrical conduit systems employing metallic conduit and housing components, it is necessary to ground solidly such components in order to prevent a high voltage on the exposed parts in the event of conductor insulation failure. In the past, where conduit unions or fittings employing relatively movable parts have been used, it has been necessary to ground the system on both sides of the fitting, or to provide a flexible conductive jumper strap connected between the conduit components on either side of the fitting. In order to eliminate the necessity of such a separate grounding connection, means are provided in the present union 10 for assuring that electrical connection is maintained between the inner and outer members 20, 21 as they are shifted relative to one another, and without in any way impairing the explosionproof properties of the union.

This electrical continuity is achieved in the present instance by the provision of an annular groove 38 in one of the two surfaces 30 or 31 and the insertion of a captive snap ring of highly conductive material into such groove. The snap ring is normally oversized with respect to the groove so that it is yieldably urged into firm electrical contact with the other surface. As here shown, the groove 38 is formed at the inner end of the surface 30 and a discontinuous snap ring 39, formed of resilient conductive metal such as a high percentage copper alloy, is held captive in the groove. The snap ring 39 is so formed that it is biased outwardly from the groove and into firm engagement with the inner surface 31. Chord portions 40, 41 and 42 of the ring 39 remain in the groove whenever the inner and outer parts are completely separated so that the ring 39 cannot be lost and so that the ring is shifted axially with the inner member 20 as it is moved relative to the outer member 21. The ring 39 thus assures that the inner and outer members 20, 21 are always electrically connected even though the surfaces 30, 31 have such a tolerance that absolutely perfect electrical connection might not always be present between them.

As illustrated and as described above, the explosionproof union is constructed such that the axial lengths of the outer and inner surfaces 30 and 31 are respectively equal or greater than two and four times the minimum length of a threaded connection. This makes it possible to employ a single union 10 to insert a length of conduit between fixed components (Figs. 1 and 1a) while still maintaining the explosionproof integrity of the union. However, it is to be understood that the inner surface 31 of the outer member 21 may be made axially shorter, so that the range of telescoping between the members 20 and 21 is not so great, when the union is to be employed under different circumstances.

From the foregoing, it will be apparent that the invention here disclosed brings forth a conduit union which is, first, reliably explosionproof. In addition, that union is of small diameter and requires but two main parts which are always rotationally and axially movable relative to one another; nothing rigidly locks them together. Accordingly, the union is relatively simple and economical in construction, assembly, and installation. Still further, once the union is assembled, its explosionproof characteristics cannot be impaired by careless handling because the cooperating surfaces are always protected. And upon installation, no ground jumper is required since good electrical continuity is established between the two relatively movable parts.

This application is a continuation of my earlier application Serial No. 430,152, filed May 17, 1954, and now abandoned.

I claim as my invention:

A two-piece explosionproof electrical conduit union comprising the combination of a pair of inner and outer metallic cylindrical telescoping members having respective outer and inner surfaces rotationally and axially slidably interengaging with close tolerance, said tolerance being sufficiently great to permit restricted passage of fluids and gases between said surfaces, threads on the opposite extremities of said members for connecting the latter to matingly threaded components of an explosionproof conduit system, said threads being at least as long as the minimum length for explosionproof threaded connections in the conduit system, means to prevent a conduit component threadably connected to either of said members from engaging the other of said members when said threads are tightened, said inner surface having an axial length at least equal to four times the minimum length of each threaded connection in the conduit system and said outer surface having an axial length at least equal to twice the minimum length of each such threaded connection to thereby provide a tortuous path of sufficient length to prevent the escape of hot gases from within the union, means for preventing axial separation of said members and assuring that the length of mutual engagement between said surfaces is never less than twice the length of said threaded connection, said outer surface of the inner member having an annular groove formed therein, and a resilient snap ring of conductive material captive in said groove and yieldably urged into sliding electrical contact with the inner surface of said outer member to thereby insure electrical continuity between said members as they are shifted relative to one another.

References Cited in the file of this patent

UNITED STATES PATENTS

| | | |
|---|---|---|
| 1,580,325 | Perry | Apr. 13, 1926 |
| 2,106,444 | Tornblom | Jan. 25, 1938 |
| 2,280,728 | Streib | Apr. 21, 1942 |
| 2,533,097 | Dale | Dec. 5, 1950 |